United States Patent [19]

Nagumo et al.

[11] Patent Number: 5,299,023
[45] Date of Patent: Mar. 29, 1994

[54] PORTABLE VIDEO CAMERA AND RECORDING APPARATUS

[75] Inventors: Fumio Nagumo; Takashi Asaida; Kenji Nakamura; Yoshio Chiba, all of Kanagawa, Japan

[73] Assignee: Sony Corporation, Japan

[21] Appl. No.: 913,359

[22] Filed: Jul. 15, 1992

Related U.S. Application Data

[62] Division of Ser. No. 603,325, Oct. 25, 1990.

[30] Foreign Application Priority Data

Oct. 31, 1989 [JP] Japan .................................. 1-283305

[51] Int. Cl.$^5$ ............................................ H04N 9/80
[52] U.S. Cl. ..................................... 358/330; 358/310; 358/320; 358/906
[58] Field of Search .............. 358/310, 330, 320, 906, 358/909, 335, 337; 360/29, 30; H04N 9/79, 9/80

[56] References Cited

U.S. PATENT DOCUMENTS

4,887,169 12/1989 Bannai et al. ........................ 358/335
4,963,991 10/1990 Honjo ................................. 358/310

Primary Examiner—tommy P. Chin
Assistant Examiner—Khoi Truong
Attorney, Agent, or Firm—Ronald P. Kananen

[57] ABSTRACT

A portable video camera and recording apparatus is comprised of a video camera section and a recording section. The video camera section is comprised of a CCD, analogue-to-digital converters for converting signals from the CCD into digital form. The digital signals are then processed, converted into analogue form, processed in analog form, and then output as the composite video signal. A digital luminance signal and either a digital composite color signal or a plurality of digital color difference signals are received as inputs into the recording section. If the digital composite color signal is received, then the signals are time-base-compressed, converted into analogue form, the composite color signal is frequency converted and filtered and the luminance signal is frequency modulated and filtered. Next, the signals are added together and recorded onto a recording medium. If the digital color difference signals are received, the digital color difference signals are multiplexed together, converted into analogue form, frequency modulated, filtered and then recorded onto one track on the recording medium. The digital luminance signal is time-base-compressed, converted into analogue form, frequency modulated, filtered, and then recorded onto a second track on the recording medium.

5 Claims, 8 Drawing Sheets

PORTABLE VIDEO CAMERA AND RECORDING APPARATUS

This application is a continuation division of application Ser. No. 07/603,325 filed Oct. 25, 1990.

BACKGROUND OF THE INVENTION

1. Field of the Invention

The present invention generally relates to video tape recorders and, more particularly, is directed to a video tape recorder having a built-in type camera in which a video camera section and a recording section are integrally formed as one body on the same chassis completely and mechanically.

2. Description of the Prior Art

In a conventional video tape recorder having a built-in type camera, a video camera section and a recording section are integrally formed as one body on the same chassis, and its signal processing system processes a signal in the form of an analogue signal. Although the signal processing system can process the signal in the form of a digital signal, a so-called digital video tape recorder in which an input signal is recorded on and/or reproduced from a record medium such as a magnetic tape or the like in the form of the digital signal becomes large in size. Therefore, such digital video tape recorder is not suitable for portable use unlike the video tape recorder having a built-in type camera which is usually carried by the cameraman.

For this reason, a video tape recorder having a built-in type camera is proposed, which is formed by the combination of a camera section in which, for example, a signal processing is performed in a digital fashion and a video tape recorder section in which a signal is processed in an analogue fashion and a signal is recorded and/or reproduced in an analogue fashion.

This previously-proposed video tape recorder having a built-in type camera will be described with reference to FIG. 1.

Figure 1:
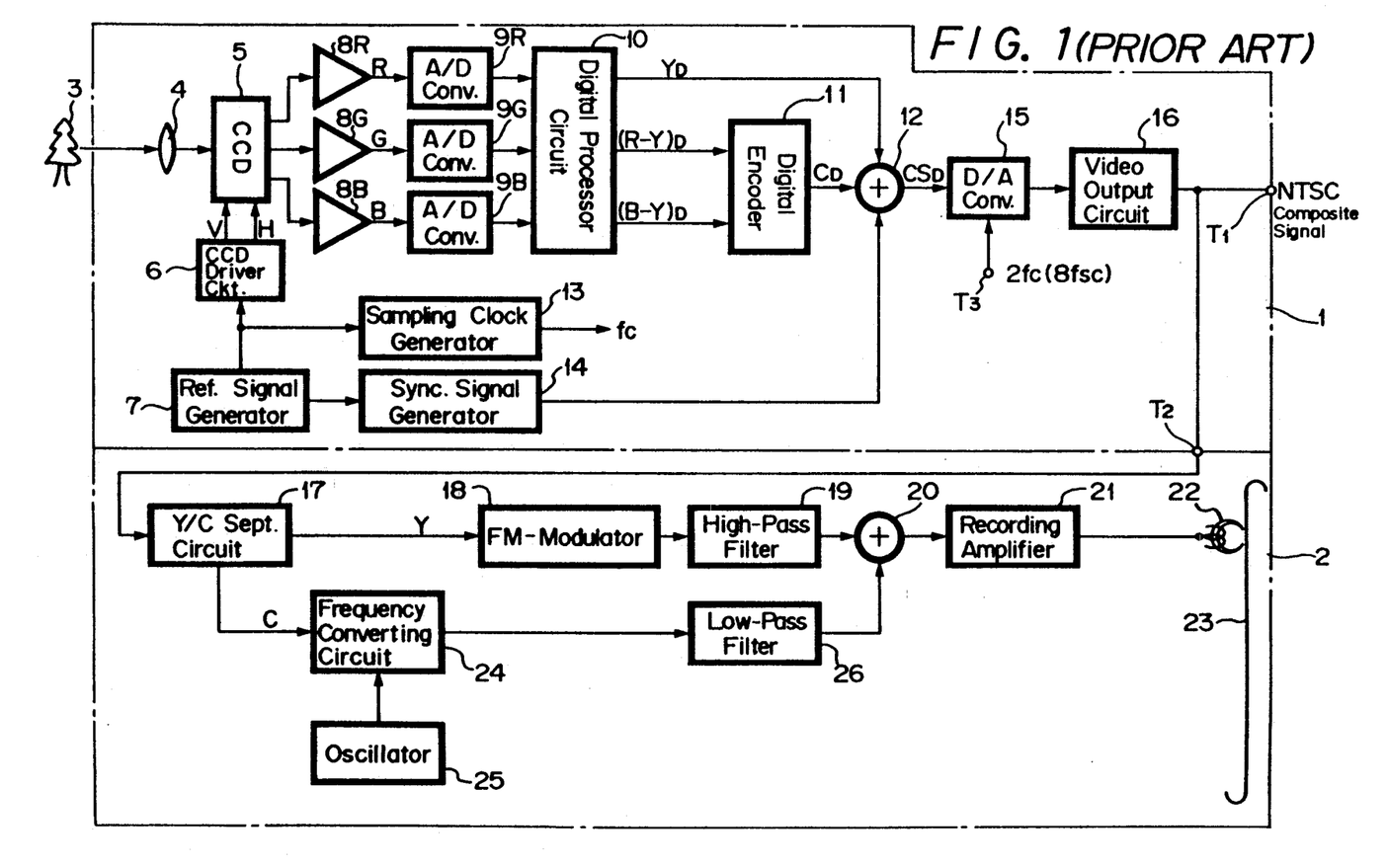
FIG. 1 is a block diagram showing an example of a conventional video tape recorder having a built-in type camera.

It will be seen in FIG. 1 that an image pickup section, i.e., a camera section 1 is comprised of an image pickup element and a signal processing section while a recording section, i.e., a video tape recorder section is provided, which is generally represented by reference numeral 2. The camera section 1 and the video tape recorder section 2 are integrally formed as one body by some suitable mechanical coupling means, though not shown, to form a video tape recorder having a built-in type camera. Alternatively, a video tape recorder having a built-in type camera might be such that a camera section and a video tape recorder section are perfectly formed within the same chassis.

An image of an object 3 is focused on an image pickup element such as a charge coupled device (CCD) 5 or the like via a lens 4. The CCD 5 is formed as a single plate type in which, for example, R (red), G (green) and B (blue) optical filters, though not shown, are arranged on its front in a checkered pattern. The CCD 5 is scanned by a drive signal from a CCD driver circuit 6 which is supplied with a reference frequency from a reference signal generator 7. The CCD 5 derives the three primary color signals R, G and B. These R, G and B signals generated from the CCD 5 are all in the form of analogue signals and are respectively supplied through R, G and B amplifiers 8R, 8G and 8B to analogue-to-digital (A/D) converters 9R, 9G and 9B, thereby converted to digital signals.

The R, G and B data thus converted to digital signals are supplied to a digital processor circuit 10, in which they undergo digital processings, such as, gamma correction, white clip processing, matrix processing and the like, thus the R, G and B data are converted to a digital component luminance signal $Y_D$ and digital color difference signals $(R-Y)_D$ and $(B-Y)_D$. The digital luminance signal $Y_D$ is directly supplied to an adder 12, while the digital color difference signals $(R-Y)_D$ and $(B-Y)_D$ are supplied to a digital encoder 11, in which they are encoded to a digital chroma signal CD similar to I and Q signals and are interpolated in bit synchronization with the digital luminance signal $Y_D$. The resultant signal is supplied to the adder 12. The adder 12 is supplied with a vertical synchronizing (sync.) signal and a burst signal from a digital synchronizing signal generator 14 to which the reference signal is supplied from the generator 7 and generates a digital composite signal (composite video signal) $CS_D$. A sampling clock generator 13 which is supplied with the reference signal from the generator 7 is adapted to generate a sampling clock fc=4 fsc which is used to obtain a subcarrier (referred to hereinafter as fsc). The digital composite signal $CS_D$ from the adder 12 is supplied to a digital-to-analogue (D/A) converter 15 and is thereby converted to an analogue composite signal in response to a clock 2 fsc supplied thereto from a terminal $T_3$.

While the digital luminance signal $Y_D$ and the digital chroma signal $C_D$ from the digital encoder 11 are digitally added together by the adder 12 as described above, such a variant is also possible that these data are converted to analogue signals by a digital-to-analogue converter and are then added by an adding circuit in an analogue fashion, though not shown.

The analogue composite signal from the digital-to-analogue converter 15 is fed through a video output circuit 16 to an output terminal $T_1$ as, for example, an NTSC analogue composite signal. It is needless to say that the analogue composite signal may be a PAL or SECAM analogue composite signal.

The camera section 1 is provided with a terminal $T_2$, and the terminal $T_2$ is supplied with an analogue composite signal CS from the video output circuit 16.

The video tape recorder section 2 and the camera section 1 are integrally formed as one body as earlier noted and the video tape recorder section 2 will be described next.

As FIG. 1 shows, the analogue composite signal CS from the terminal $T_2$ of the camera section 1 is supplied to a Y/C separating circuit 17 of the video tape recorder section 2, in which it is separated to provide an analogue luminance signal Y and an analogue chroma signal C. The analogue luminance signal Y is supplied to an FM (frequency modulation)-modulator 18, in which it is FM-modulated and fed through a high-pass filter (HPF) 19 to an adding circuit 20. The analogue chroma signal C from the Y/C separating circuit 17 is supplied to a frequency converting circuit 24. The frequency converting circuit 24 is supplied with a local oscillation output of, for example, 4.268 MHz from an oscillator 25 and converts the analogue chroma signal C of 3.58 MHz into the analogue chroma signal C of low frequency,, i.e., 688 kHz. The thus frequency-converted low frequency analogue chroma signal C is supplied through a low-pass filter (LPF) 26 to the adding circuit 20, in which it is frequency-multiplexed with the analogue luminance signal Y. The resultant signal from the adding circuit 20 is supplied through a recording amplifier 21 to a rotary head 22, thereby recorded on a recording tape 23 as an analogue video signal.

Figure 2A:
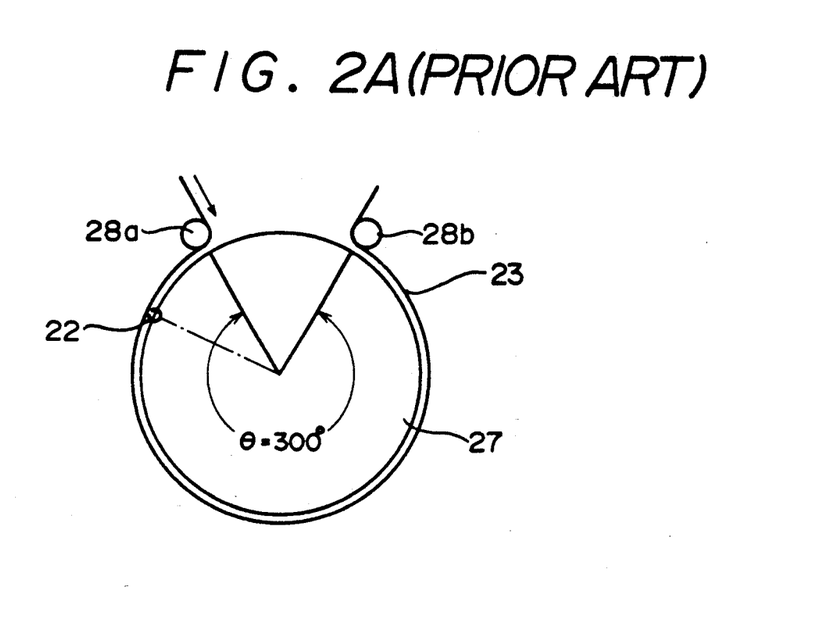
FIG. 2A is a schematic diagram showing a conventional rotary head assembly used in the prior-art video tape recorder having a built-in type camera shown in FIG. 1.
Figure 2B:
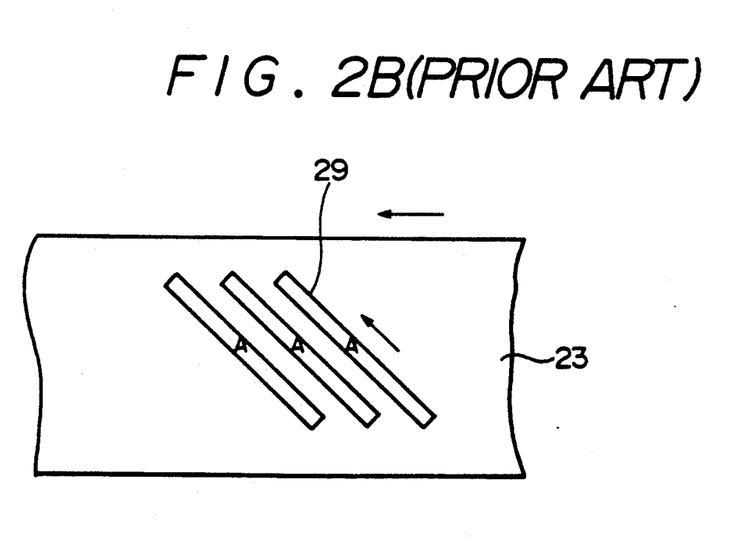
FIG. 2B is a schematic diagram showing a pattern of recording tracks formed on a tape, and to which reference will be made in explaining an operation of the conventional video tape recorder having a built-in type camera.

An arrangement of the rotary head 22 is illustrated in FIG. 2A, and as shown in FIG. 2A, the recording tape 23 is obliquely wrapped around a tape guide drum 27 in a tape wrapping angle of about 300 degrees in an ohm-shape via a pair of tape guide members 28a and 28b in order to miniaturize the rotary head 22 or the video tape recorder section 1. This rotary head 22 is rotated at a field frequency to horizontally scan the tape 23 at a frequency higher than a normal horizontal scanning frequency.. thereby recording an output signal of the video camera on tracks 29 of the tape 23 as shown in FIG. 2B.

Incidentally, according to the most popular arrangement of the aforementioned rotary head 22, the tape 23 is wrapped around a tape guide drum in an angular extent slightly larger than 180 degrees and a pair of rotary heads 22, mounted on the tape guide drum with an angular distance of 180 degrees, are rotated at a frame frequency, whereby the two rotary heads 22 are alternately brought in contact with the tape that is transported at a predetermined speed. This type of rotary head is utilized in a portable type video tape recorder which is separately provided from a camera section and it is very difficult to use this type of rotary head in the video tape recorder having a built-in type camera because a tape guide drum and a tape loading mechanism cannot be made light in weight and small in size.

Figure 3:
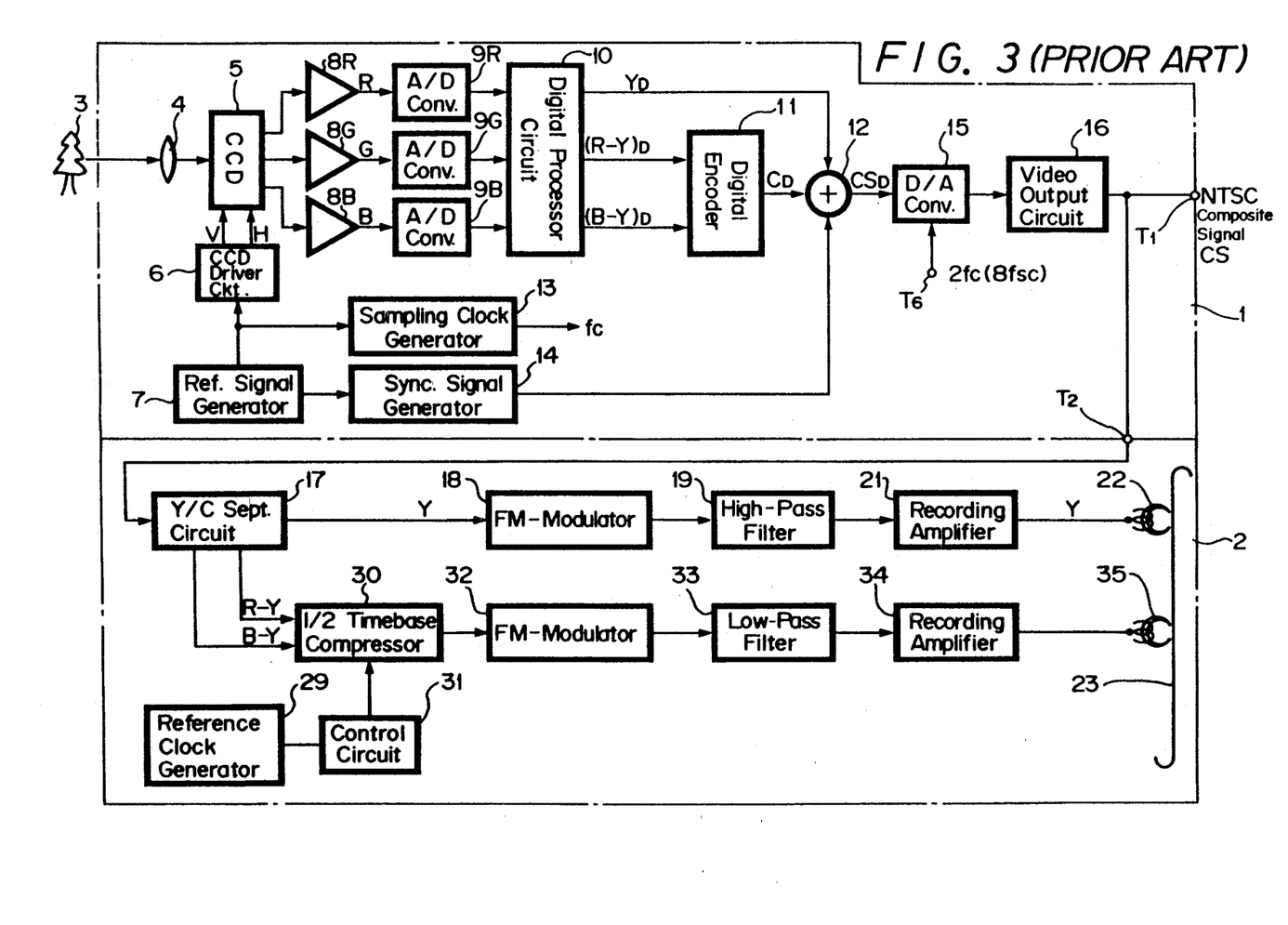
FIG. 3 is a block diagram showing another example of the conventional video tape recorder having a built-in type camera.

Further, FIG. 3 shows a professional video tape recorder (e.g., Beta Cam, MII, et cetera) which is proposed as an alternative of the arrangement of the video tape recorder section 2. In FIG. 3, like parts corresponding to those of FIG. 1 are marked with the same references and therefore need not be described in detail.

In FIG. 3, it will be seen that the analogue composite signal CS from the terminal $T_2$ of the camera section 1 is separated to provide the analogue luminance signal Y and the analogue chroma signal by the Y/C separating circuit 17 in the video tape recorder section 2. This analogue luminance signal Y is independently recorded on Y signal recording tracks of the tape 23 by a Y signal recording head 22. To this end, the analogue luminance signal Y is FM-modulated by the FM-modulator 18 and is supplied through the high-pass filter 19 and the recording amplifier 21 to the Y signal recording head 22, thereby being recorded on the Y signal recording tracks of the tape 23 by the Y signal recording head 22. This arrangement can solve the aforementioned problems, such as, low band of luminance signal and cross modulation which are encountered with the low band converted recording system shown in FIG. 1. Red and blue color difference signals R-Y and B-Y involved in the analogue chroma signal are supplied to a ½ time base compressor 30. This ½ time base compressor 30 is of an analogue type and compresses the red and blue color difference signals R-Y and B-Y by ½ under the control of a control circuit 30. Further, according to the ½ time base compressor 31, the analogue color difference signals R-Y and B-Y are alternately arranged in that order and the thus time-base-compressed color difference signals are FM-modulated by an FM-modulator 32. In that case, the time-base-compressed color difference signals are supplied through a low-pass filter 33 and a time-base-compressed color difference signal recording amplifier 34 to a time-base-compressed color difference signal recording head 35, thereby being recorded on a time-base-compressed color difference signal recording track adjacent to the luminance signal recording track.

Figure 4:
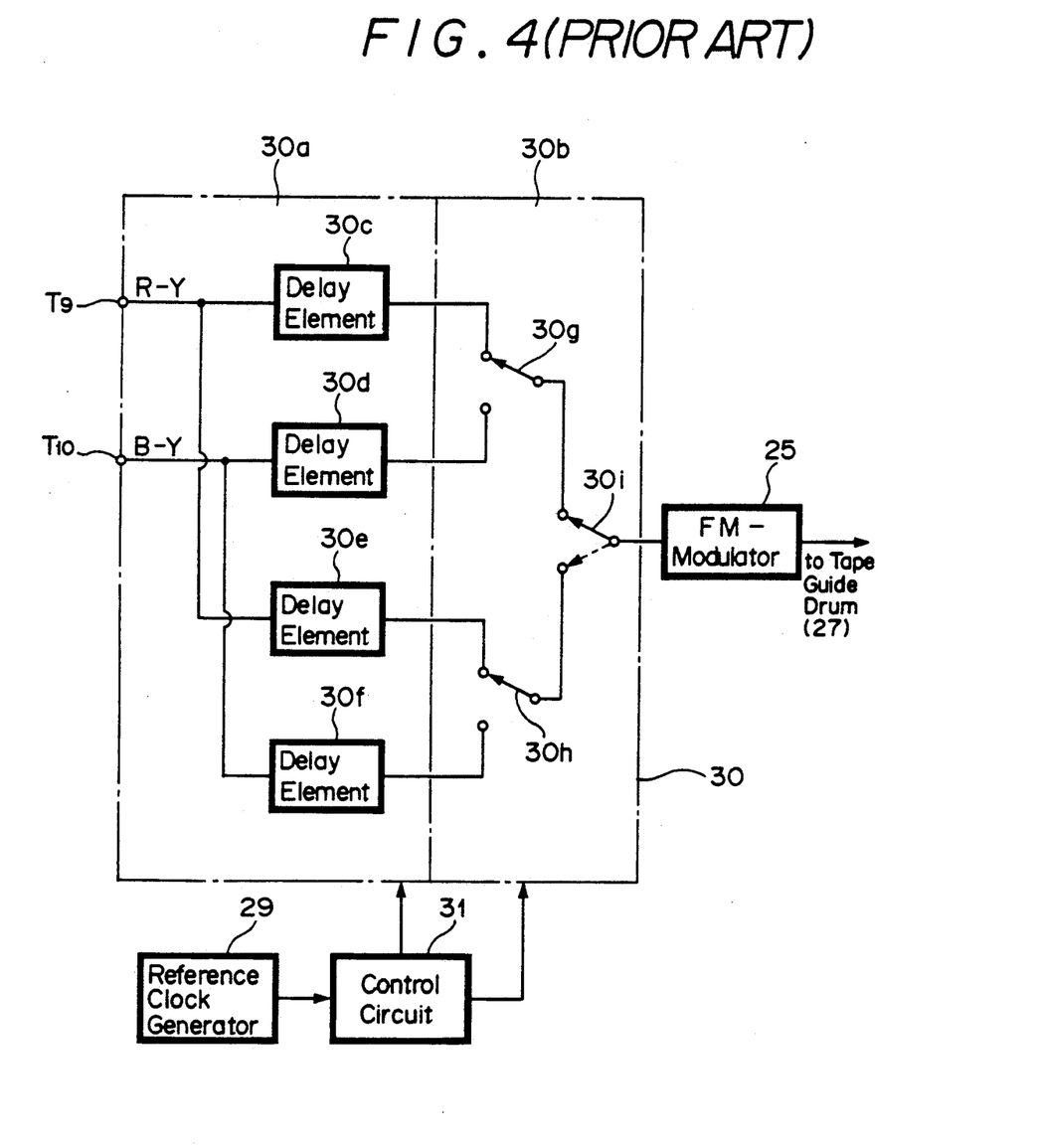
FIG. 4 is a schematic block diagram showing an example of a conventional time-base compressing circuit used in the conventional video tape recorder having a built-in type camera shown in FIG. 3.

An arrangement of the analogue time base compressor 30 is represented in FIG. 4.

As shown in FIG. 4, the time base compressor 30 is comprised of a delay section 30a formed of four delay elements 30c, 30d, 30e and 30f and a switch section 30b formed of three switches 30g, 30h and 30i. A delay time of each of the delay elements 30c, 30d, 30e and 30f is selected to be 1 H (H is the horizontal scanning period). The first and third delay elements 30c and 30e are supplied with the analogue color difference signal R-Y through a terminal $T_9$, and the second and fourth delay elements 30d and 30f are supplied with the analogue color difference signal B-Y through a terminal $T_{10}$. The switch section 30b is provided at the rear stage of these delay elements 30c to 30f in order that the color difference signals R-Y and B-Y are selected and alternately arranged in the sequential order. In this example, the switch section 30b is formed of the first switch 30g which selects the outputs of the first and second delay elements 30c and 30d, the second switch 30h which selects the outputs of the third and fourth delay elements 30e and 30f and the third switch 30i which further selects these selected outputs. The delay section 30a and the switch section 30b are controlled by the control circuit 31 which is supplied with read and write clocks from a reference clock generator 29.

In the above-described analogue ½ time base compressor 30, the delay elements which are placed in the write mode at every line are selected such that the first and second delay elements 30c and 30d are utilized in the case that the odd line is in the write mode and that the third and fourth delay elements 30e and 30f are utilized in the case that the even line is in the write mode. During the period in which the third and fourth delay elements 30e and 30f are set in the write mode, the first and second delay elements 30c and 30d are set in the read mode. At this time, the frequency of the read clock becomes twice the frequency of the write clock by the control circuit 31 so that the input analogue color difference signals R-Y and B-Y are time-base-compressed by ½. The first switch 30g is switched in position such that the first half 0.5 H of one line is assigned to the read mode of the first delay element 30c and the second half 0.5 H of one line is assigned to the read mode of the delay element 30d in order to prevent the read modes of the first and second delay elements 30c and 30d from overlapping each other. With respect to the third and fourth delay elements 30e and 30f, the second switch 30h is switched so as to prevent the read modes from overlapping each other similarly as described above. Thus, when the third switch 30i is switched as shown by a broken line in FIG. 4, the reading operation in the odd line is performed and analogue color difference signals with time base compressed by ½ are obtained. When the switch 30i is switched as shown by a solid line in FIG. 4, analogue color difference signals with time base compressed by ½ are obtained in the even line.

The compressed color difference signals with the time bases thus compressed by ½ are alternately arranged in the sequential order and fed through the FM modulator 32 to the color difference signal recording head 35.

According to the video tape recorder having a built-in type camera shown in FIGS. 1 and 2, the diameter of the tape guide drum 27 can be decreased by the amount corresponding to the increase of the tape wrapping angle of the tape 23 around the tape guide drum 27 (e.g., 180/300 if the tape wrapping angle is 300 degrees). According to this system, the video signal of duration in which the rotary head 22 is rotated by 360 degrees must be time-base-compressed by the time-base-compressing ratio corresponding to 300 degrees in which the rotary head 22 is brought in contact with the tape 23. To this end, the scanning speed of the CCD 5 must be increased. More specifically, since the scanning speed of the CCD 5 must be increased under the control of the CCD driver circuit 6 thereby to time-base-compress the video signal of one field to 5/6, this signal does not become the standard NTSC composite signal. There is then the substantial disadvantage that, even when this signal is supplied to a color monitor receiver as it is, the synchronization is disabled.

Further, in the conventional video tape recorders having a built-in-type camera shown in FIGS. 1 and 3, the analogue composite video signal CS of the camera section 1 is supplied to the video tape recorder section 2 as the input signal. This analogue composite video signal CS is frequently utilized by many video tape recorders such as a home video tape recorder and the like so that, when a signal is transmitted from the camera section 1 to the video tape recorder section 2 as the composite signal CS, the video tape recorder section 2 side needs the Y/C separating circuit 17. When such Y/C separating circuit 17 is utilized, if the luminance signal Y and the chroma signal C are not separated positively, a so-called cross color in which the chroma signal C is mixed into the luminance signal Y occurs. Conversely, the luminance signal Y is mixed into the chroma signal C so that a dot interference occurs in the picture at its portion in which the picture is changed rapidly.

Further, in the video tape recorder in which, as shown in FIG. 3, the luminance signal Y is FM-modulated and recorded on one track and the color difference signals are time-base-compressed by ½ for the luminance signal, FM-modulated and then recorded on the different recording track so that a video image of high quality can be obtained, the color difference signals R-Y and B-Y are time-base-compressed by ½ for the luminance signal Y, which requires the analogue ½ time-base-compressor 30 and the control circuit 31 which controls the analogue ½ time-base-compressor 30. Also, the arrangement of the ½ time-base-compressor 30 and the control circuit 31 needs the reference clock generator 29 or the like and needs a complicated IC circuit.

Furthermore, it is proposed that such time-base-compressor is formed of a digital memory or the like. In that case, such proposal requires an analogue-to-digital converter for converting a composite signal into a digital signal in the video tape recorder section 2, which provides a large and expensive apparatus. There is then the substantial disadvantage that the conventional video tape recorder having a built-in type camera unavoidably needs a large power source in spite of the requirements in which this type of apparatus should be miniaturized and driven by a battery power source.

OBJECTS AND SUMMARY OF THE INVENTION

Accordingly, it is an object of the present invention to provide an improved video tape recorder having a built-in type camera in which the aforementioned shortcomings and disadvantages of the prior art can be eliminated.

More specifically, it is an object of the present invention to provide a video tape recorder having a built-in type camera in which a video signal can be prevented from being deteriorated substantially.

It is another object of the present invention to provide a video tape recorder having a built-in type camera which can be miniaturized.

It is a further object of the present invention to provide a video tape recorder having a built-in type camera in which a power consumption can be reduced.

According to a first aspect of the present invention, a portable video camera and recording apparatus is comprised of a video camera section which is comprised of a solid state imager for scanning an input image and for outputting at least two analogue color video signals, analogue-to-digital converters for converting the analogue color video signals to digital color video signals, respectively, a first digital processor for processing the digital color video signals and outputting a digital component video signal which comprises a digital luminance signal and two digital color difference signals, a second digital processor for processing the digital color difference signals and outputting a digital composite color signal, and a third digital processor for processing the digital luminance signal and the digital composite color video signal and outputting an analogue composite video signal, and a recording section is comprised of a first time-base-compressing circuit for receiving and time-base-compressing the digital luminance signal and outputting a digital time-base-compressed luminance signal, a second time-base-compressing circuit for receiving and time-base-compressing the digital composite color signal and outputting a digital time-base-compressed composite color signal, digital-to-analogue converters for converting the digital time-base-compressed luminance signal and the digital time-base-compressed composite color signal to analogue signals, respectively, a frequency modulating circuit for frequency-modulating the analogue time-base-compressed luminance signal, a frequency converter for frequency-converting the analogue time-base-compressed composite color signal, an adding circuit for adding the analogue time-base-compressed luminance signal and analogue time-base-compressed composite color signal into a recording video signal, and a transducer for recording the recording video signal on a recording medium.

As a second aspect of the present invention, a portable video camera and recording apparatus is comprised of a video camera section which is comprised of a solid state imager for scanning an input image and for outputting at least two analogue color video signals, analogue-to-digital converters for converting the analogue color video signals to digital color video signals, respectively, a first digital processor for processing the digital color video signals and outputting a digital component video signal which comprises a digital luminance signal and two digital color difference signals, a second digital processor for processing the digital color difference signals and outputting a digital composite color signal, and a third digital processor for processing the digital luminance signal and the digital composite color signal and outputting an analogue composite video signal, and a recording section which is comprised of a first time-base-compressing circuit for receiving and time-base-compressing the digital luminance signal and outputting a digital time-base-compressed luminance signal, a multiplexing circuit for time-multiplexing the digital color difference signals into a digital time-multiplexed color difference signal, a first digital-to-analogue converter for converting the digital time-base-compressed luminance signal to an analogue time-base-compressed luminance signal, a second digital-to-analogue converter for converting the digital time-multiplexed color difference signal to an analogue time-multiplexed color difference signal, a first frequency modulating circuit for frequency-modulating the analogue time-base-compressed luminance signal, a second frequency modulating circuit for frequency-modulating the analogue time-multiplexed color difference signal, a first transducer for recording the analogue frequency-modulated time-base-compressed luminance signal on a first track on a recording medium, a second transducer for recording the analogue frequency-modulated time-multiplexed color difference signal on a second track on the recording medium.

The preceding, and other objects, features and advantages of the present invention will be apparent in the following detailed description of the preferred embodiments when read in conjunction with the accompanying drawings, in which like reference numerals are used to identify the same or similar parts in the several views.

DETAILED DESCRIPTION OF THE PREFERRED EMBODIMENTS

Referring to the drawings in detail, and initially to FIGS. 5 to 7, a first embodiment of the video tape recorder having a built-in type camera according to the present invention will be described. Throughout FIGS. 5–7, like parts corresponding to those of FIG. 1 are marked with the same references and therefore need not be described in detail.

Figure 5:
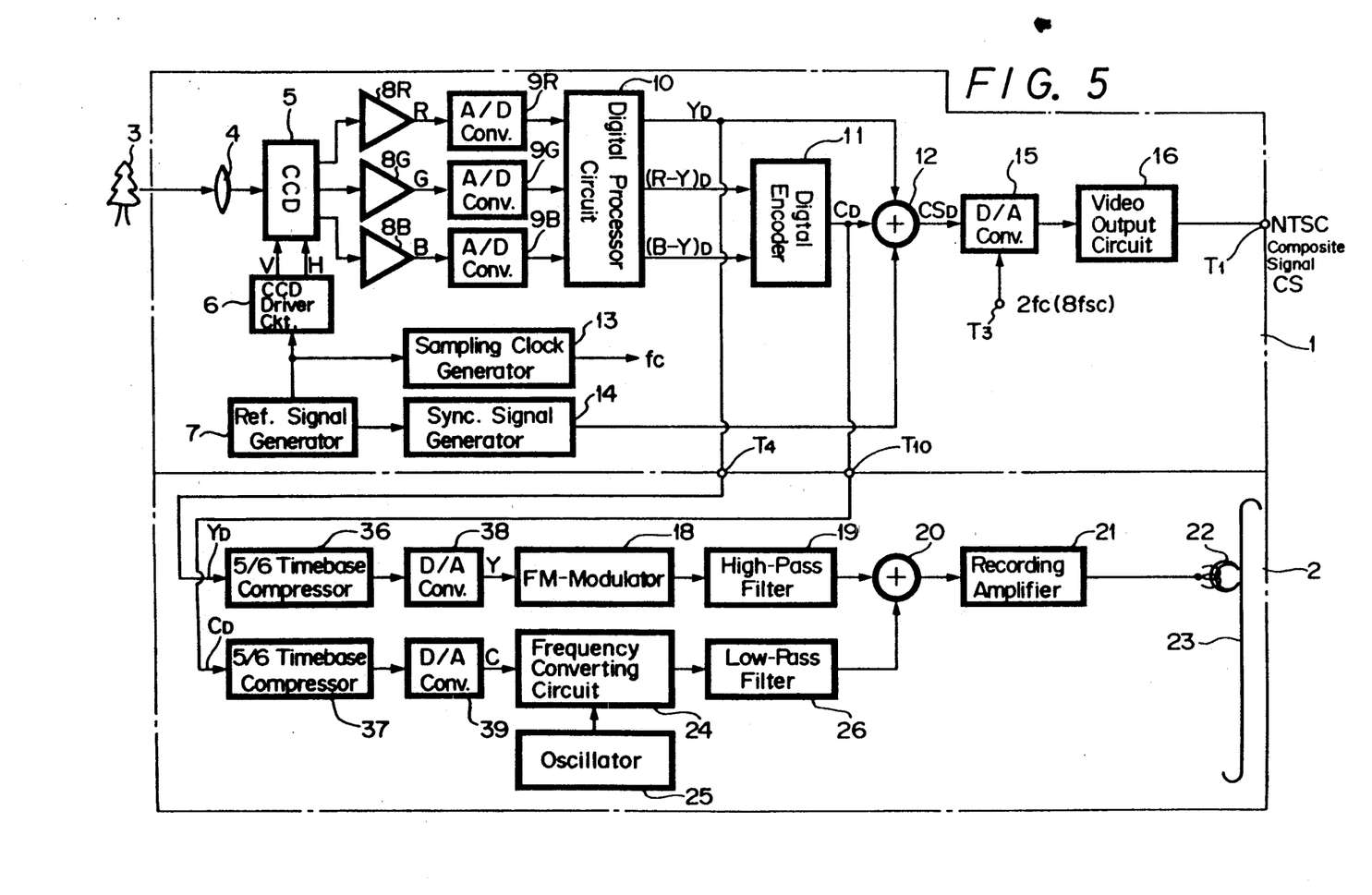
FIG. 5 is a block diagram showing a first embodiment of a video tape recorder having a built-in type camera according to the present invention.

As shown in FIG. 5, the digital luminance signal $Y_D$ from the digital processor 10 in the camera section 1 and a digital component signal formed of the digital chroma signal $C_D$ such as the I and Q signals from the digital encoder 11 are supplied to intermediate terminals $T_4$ and $T_{10}$, respectively and are fed to the video tape recorder section 2.

Figure 6:
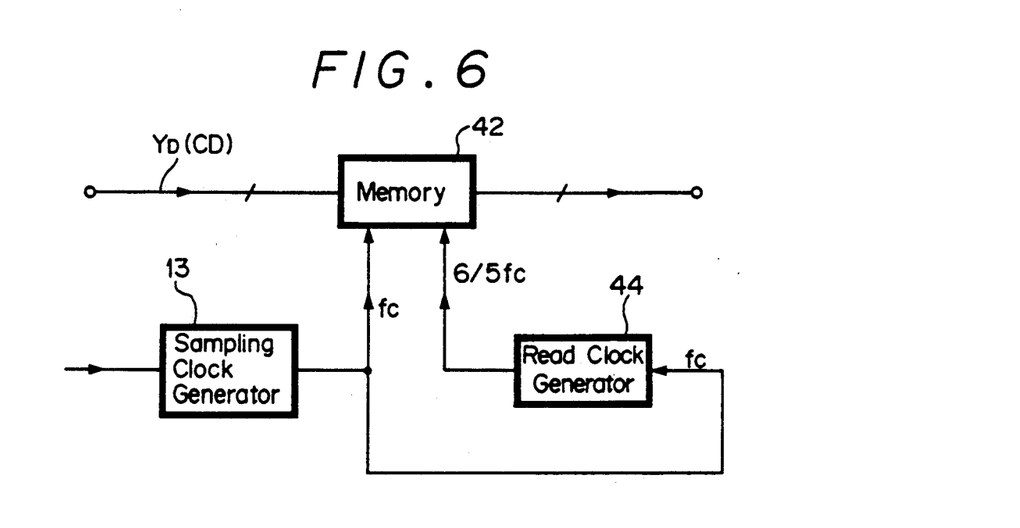
FIG. 6 is a schematic block diagram showing an example of a time-base compressing circuit used in the video tape recorder having a built-in type camera shown in FIG. 5.
Figure 7A:
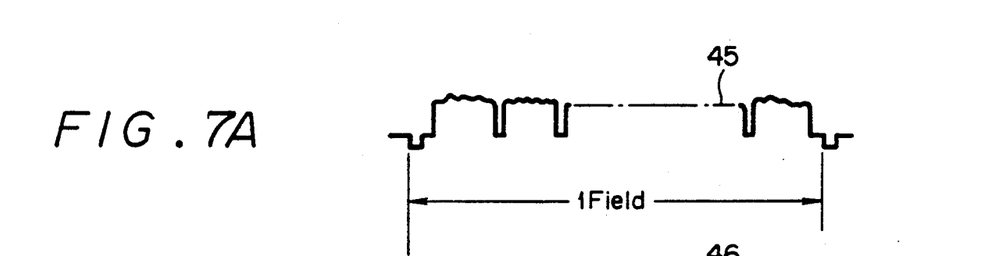
FIGS. 7A–7C are waveform diagrams of signals used to explain an operation of the circuit shown in FIG. 6.
Figure 7B:
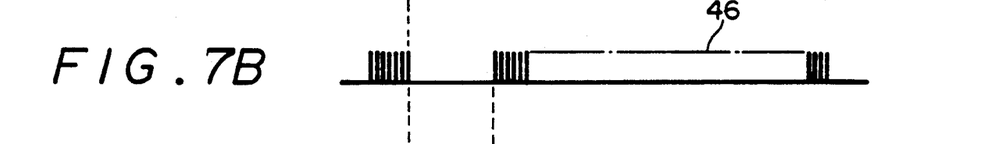
Figure 7C:
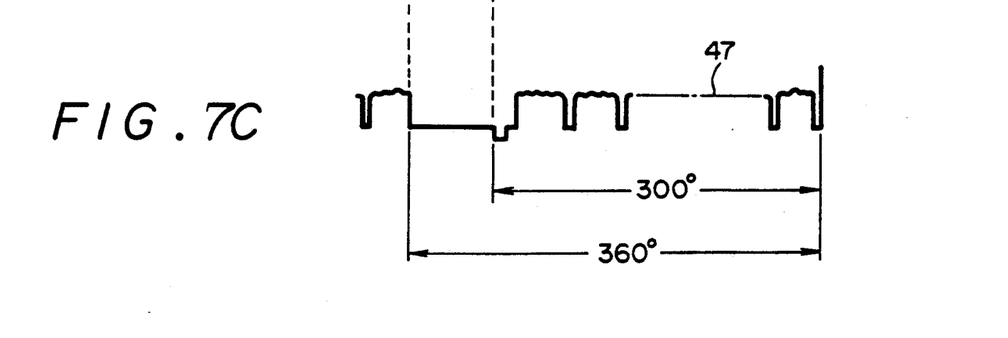

The digital luminance signal $Y_D$ and the digital chroma signal $C_D$ from the intermediate terminals $T_4$ and $T_{10}$ are respectively supplied to 5/6 time base compressors 36 and 37 each having a field memory shown in FIG. 6. Referring to FIG. 6, each of the 5/6 time base compressors 36 and 37 is formed of a digital field memory 42, and as a write sampling clock of this field memory 42, it is possible to use the clock frequency fc from the sampling clock generator 13 provided at the side of the camera section 1. A read clock generator 44 is adapted to generate a read clock that is used to control a read-out speed of the memory 42. This read clock generator 44 is supplied with the clock frequency fc from the sampling clock generator 13 and increases the read-out clock frequency 6/5 times the read-out clock frequency fc. This read-out clock 6/5 fc is supplied to the memory 42 so that a video signal 45 of one field period shown in FIG. 7A is read-out from the memory 42 in response to a read-out clock 46 of frequency 6/5 fc shown in FIG. 7B. Therefore, as shown in FIG. 7C, a signal of one field period (i.e., one sixtieth of a second) of the video signal 45 is time-base-compressed by a time base compression ratio corresponding to the angular range (i.e., 300 degrees) in which the tape 23 is wrapped around the guide drum 27 as a video signal 47.

As described above, the digital luminance signal $Y_D$ and the digital chroma signal $C_D$, each of which is time-base-compressed by 5/6, are respectively supplied to digital-to-analogue converters 38 and 39 and are thereby converted into analogue signals. The analogue luminance signal Y is FM-modulated by the FM-modulator 18 similarly to FIG. 1 while the analogue chroma signal C is frequency-converted similarly to FIG. 1, down converted and added to the luminance signal, thereby being recorded on the tape 23 by the rotary head 22.

According to the above-mentioned arrangement, since the scanning speed of the CCD 5 need not be increased, the standard composite signal is obtained from the camera section 1 so that any special monitor apparatus is not required. Further, the 5/6 time base compressors 36 and 37 in the video tape recorder 2 side are controlled by a control circuit system in the camera section 1 side so that the power consumption can be reduced and the video tape recorder having a built-in type camera can be miniaturized.

Figure 8:
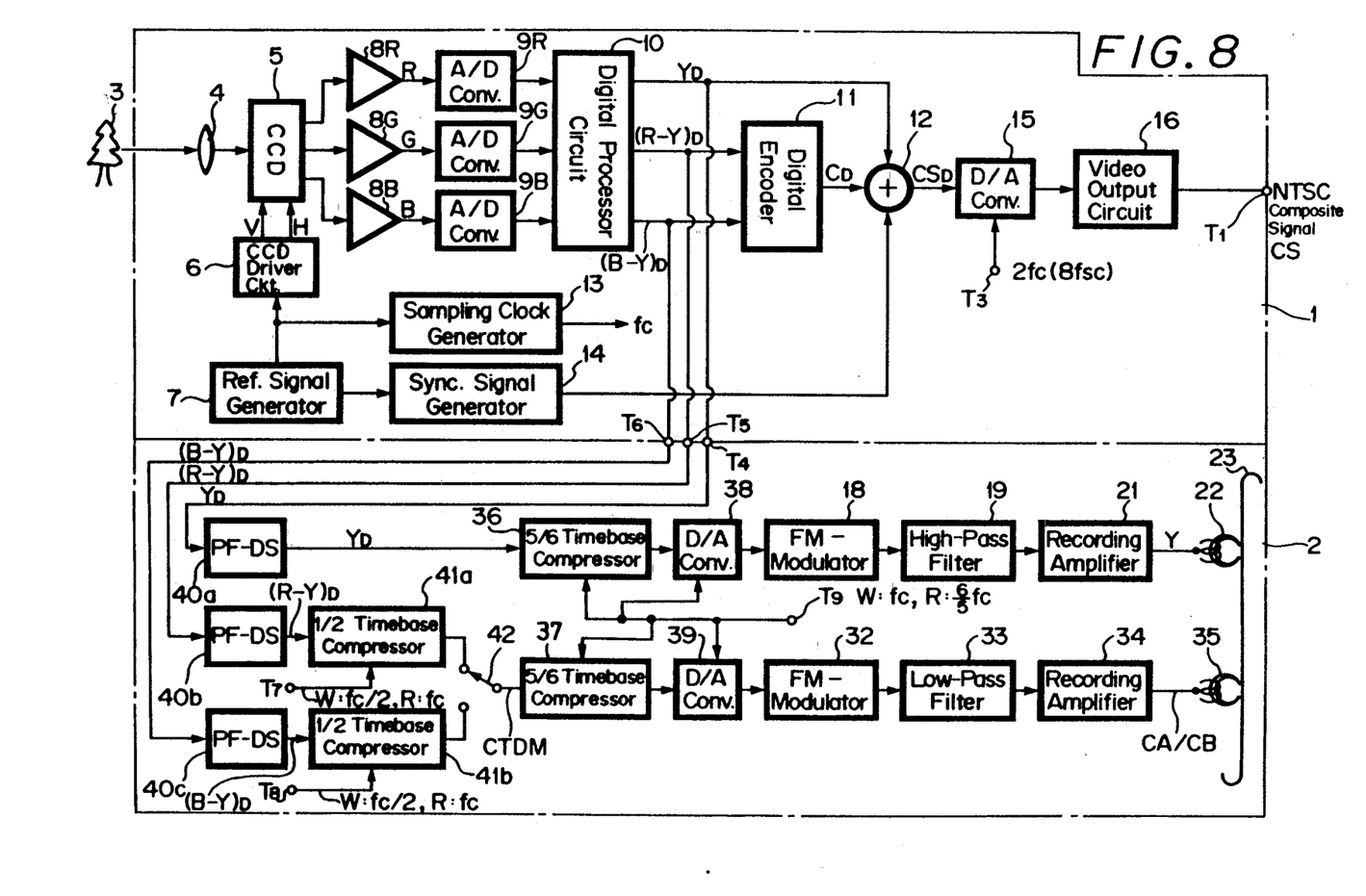
FIG. 8 is a block diagram showing a second embodiment of the video tape recorder having a built-in type camera according to the present invention.

A second embodiment of the present invention will hereinafter be described with reference to FIG. 8. In the second embodiment shown in FIG. 8, the present invention is applied to a professional video tape recorder having a built-in type camera in which a luminance signal and a chroma signal are recorded on different tracks as described in connection with FIG. 3. In FIG. 8, like parts corresponding to those of FIG. 5 are marked with the same references and therefore need not be described in detail.

As shown in FIG. 8, the digital luminance signal $Y_D$ and the digital color difference signals $(R-Y)_D$ and $(B-Y)_D$ from the digital processor 10 in the camera section 1 are supplied to intermediate terminals $T_4$, $T_5$, and $T_6$, respectively, and are fed to the video tape recorder section 2.

The digital luminance signal $Y_D$ and the digital color difference signals $(R-Y)_D$ and $(B-Y)_D$ from the intermediate terminals $T_4$, $T_5$ and $T_6$ are supplied to prefilter and down-sample circuits (referred to hereinafter as PF-DS) 40a, 40b and 40c, respectively. The reason that each component video signal is down-sampled and converted to a digital signal having a half rate is to reduce a storage capacity of a field memory which is utilized in a 5/6 time base compressor, which will be described later, regardless of some deterioration of image quality. If a field memory of mass storage capacity is utilized, it is possible to remove the prefiltering and the down-sampling.

Figure 9A:
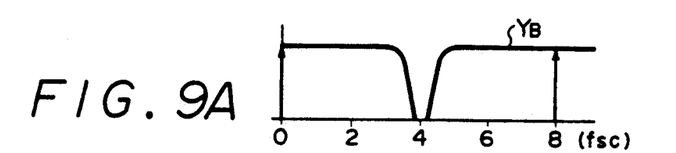
FIGS. 9A–9H are schematic diagrams used to explain a down-sampling operation of the present invention, respectively.
Figure 9B:
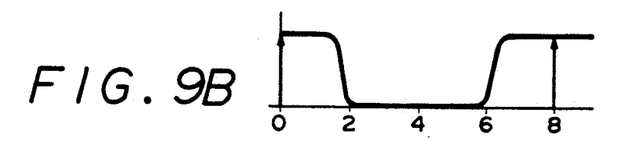
Figure 9C:
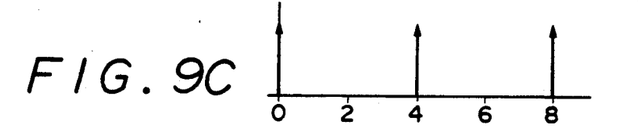
Figure 9D:
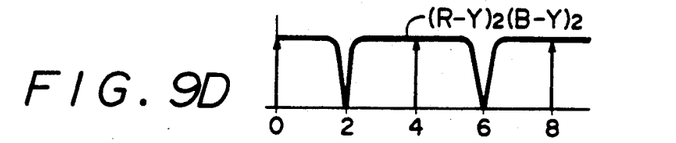
Figure 9E:
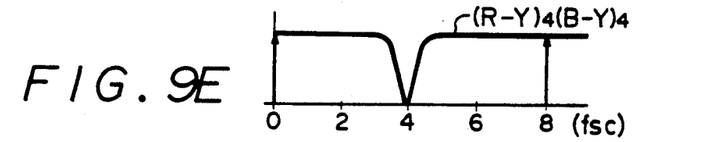
Figure 9F:
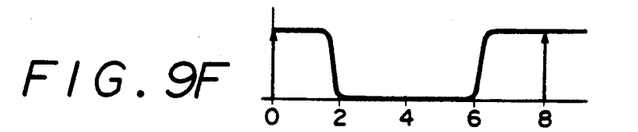
Figure 9G:
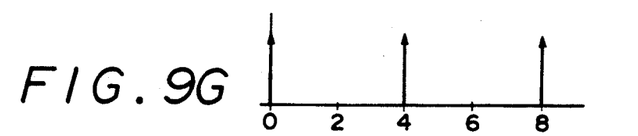
Figure 9H:
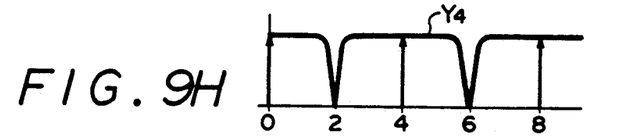

In the PF-DS circuit 40a, the digital luminance signal $Y_D$ is prefiltered and down-sampled as shown in FIGS. 9A-9D. Similarly, the digital color difference signals $(R-Y)_D$ and $(B-Y)_D$ are prefiltered and down-sampled by the PF-DS circuits 40b and 40c as shown in FIGS. 9E-9H, respectively. Throughout FIGS. 9A-9H, the abscissa indicates fsc and the ordinate indicates level. FIGS. 9A and 9E show, for example, the digital luminance signal $Y_D = Y_8$ (suffix 8 represents that this luminance signal is the digital signal which is sampled by a sampling frequency 8 times or about 8 times the subcarrier frequency fsc) and color difference signals $(R-Y)_D = (R-Y)_4$, and $(B-Y)_D = (B-Y)_4$, respectively. FIGS. 9B and 9F show characteristics in which the luminance signal $Y_8$ and the color difference signals $(R-Y)_4$ and $(B-Y)_4$ are prefiltered, respectively. FIGS. 9C and 9G show the condition that the luminance signal $Y_8$ and the color difference signals $(R-Y)_4$ and $(B-Y)_4$ are down-sampled and a cross over modulation can be suppressed by down-sampling the luminance signal $Y_8$ into $Y_4$ and the color difference signals $(R-Y)_4$ into $(R-Y)_2$ and the color difference signal $(B-Y)_4$ into $(B-Y)_2$ by ½ as shown in FIGS. 9D and 9H. The luminance signal $Y_D = Y_4$ down-sampled by the PF-DS circuit 40a is supplied to the 5/6 time base compressor 36 similar to that of FIG. 5, in which it is time base compressed by 5/6 and is converted into an analogue luminance signal Y by the digital-to-analogue converter 38.

The color difference signals $(R-Y)_D = (R-Y)_2$ and $(B-Y)_D = (B-Y)_2$ thus down-sampled by the PF-DS circuits 40b and 40c are supplied to ½ time base compressors 41a and 41b, respectively. Each of the ½ time base compressors 41a and 41b might be formed of a digital field memory similarly to the 5/6 time base compressor 36. As a sampling clock generator for generating read and write sampling clocks of this field memory and a reference signal generator, those provided at the camera section 1 side may be used, and alternatively, they may be independently provided at the video tape recorder 2 side. Since the video signal supplied from the camera section 1 to the video tape recorder section 2 is already supplied as digital data, the analogue-to-digital converter or the like need not be provided at the video tape recorder section 2. These ½ time base compressors 41a and 41b are supplied at their terminals $T_7$ and $T_8$ with sampling clocks fc =4 fsc and fc/2=2 fsc from the sampling clock generator 13.

A method for time-base-compressing these color difference signals $(R-Y)_D$ and $(B-Y)_D$ by ½ will be described with reference to FIGS. 10A-10D.

Figure 10A:
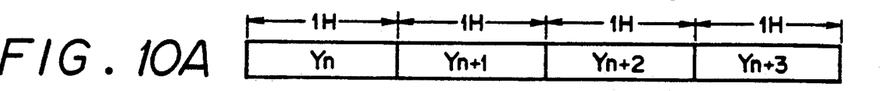
FIGS. 10A–10D are schematic diagrams used to explain time-base-compressing operation and time-multiplexing operation of the present invention, respectively.
Figure 10B:
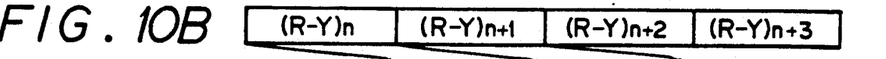
Figure 10C:
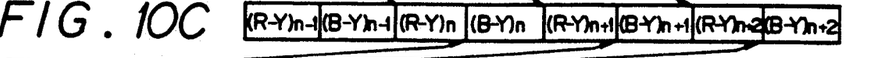
Figure 10D:
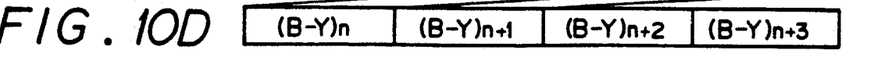

FIG. 10A shows data of the luminance signal $Y_D$ of one horizontal scanning period (1H) from n'th to (n+3)'th lines, and FIGS. 10B and 10D respectively show signals of the color difference signals $(R-Y)_D$ and $(B-Y)_D$ of 1H period from n'th to (n+3)'th lines. In that case, the write clock frequency W of the field memory assumes fc/2 and the read clock frequency R thereof assumes fc. Then, the n'th color difference signal $(R-Y)n$ is time-base-compressed by ½. In a like manner, the n'th color difference signal $(B-Y)$ is also time-base-compressed by ½ and then delivered. Thus, if a delayed signal is supplied from the ½ time base compressor 41a to the switch 42 so that the delayed signal is delayed by 0.5 H through a delay element or the like and this switch 42 is alternately changed-over, it is possible to obtain a composite color difference signal CTDM (i.e., chroma time division multiplexed) which is time-base-compressed by ½ as shown in FIG. 10C. The thus obtained color difference signal CTDM is supplied to the 5/6 time base compressor 37 similar to that of FIG. 5 and is thereby time-base-compressed by 5/6 so that one field period is compressed within a range of 300 degrees. The compressed data from the 5/6 time base compressor 37 is supplied to a digital-to-analogue converter 39, in which it is converted into an analogue signal. The 5/6 time base compressors 36, 37 and the digital-to-analogue converters 38, 39 are supplied with the write clock fc and the read clock 6/5 fc from the sampling clock generator 13 through a terminal $T_9$ upon writing. Further, while the ½ time base compressors 41a, 41b and the 5/6 time base compressors 36, 37 are independently provided in the above-described embodiment, it is needless to say that they may be formed as a 5/12 time base compressor which performs ½ time-base-compression and 5/6 time-base-compression simultaneously.

The analogue luminance signal and analogue color difference signals from the analogue-to-digital converters 38 and 39 are respectively FM-modulated by the FM-modulators 18 and 32 and are then fed to the luminance signal recording head 22 and the color difference signal recording head 35, each having different azimuth angle, whereby they are simultaneously recorded on two tracks. Outputs from the two recording heads 22 and 35 are recorded on the tape 23 which is obliquely wrapped around the tape guide drum in an angular extent of substantially 300 degrees.

In the second embodiment, similar effects to those of the first embodiment shown in FIG. 5 can be achieved. While the color difference signals are converted in the form of analogue to digital signals and are then recorded on the two tracks by two chroma signal and luminance signal rotary heads as described above, the present invention can also be applied to such a case that two color difference signals are converted in the form of digital to analog signals, FM-modulated by two different frequencies, mixed and can be recorded on one track.

According to the video tape recorder having a built-in type camera of the present invention, it is possible to obtain the video tape recorder having a built-in type camera of compact size in which the deterioration of video signal is small and a power consumption can be reduced.

Having described preferred embodiments with reference to the accompanying drawings, it is to be understood that the invention is not limited to those precise embodiments and that various modifications and variations thereof could be effected by one skilled in the art without departing from the spirit or scope of the novel concepts of the invention as defined in the appended claims.

We claims as our invention:

1. A video tape recorder having a built-in type camera in which a video camera section and a recording section are integrally formed as one body, comprising:

said video camera section comprising:

solid state imager means for scanning an input image and for outputting at least two analogue color video signals;

analogue-to-digital converter means for converting said analogue color video signals to digital color video signals, respectively;

first digital processor means for processing said digital color video signals and outputting a digital component video signal which comprises a digital luminance signal and two digital color difference signals;

second digital processor means for processing said digital color difference signals and outputting a digital composite color signal; and third digital processor means for processing said digital luminance signal and said digital composite color signal and outputting an analogue composite video signal which is supplied to an output terminal; and said recording section comprising;

first time-base-compressing means for receiving and time-base-compressing said digital luminance signal and outputting a digital time-base-compressed luminance signal;

multiplexing means for time-multiplexing said digital color difference signals into a digital time-multiplexed color difference signal;

first digital-to-analogue converter means for converting said digital time-base-compressed luminance signal to an analogue time-base-compressed luminance signal;

second digital-to-analogue converter means for converting said digital time-multiplexed color difference signal to an analogue time-multiplexed color difference signal;

first frequency modulating means for frequency-modulating said analogue time base-compressed luminance signal;

second frequency modulating means for frequency-modulating said analogue time-multiplexed color difference signal;

first transducer means for recording said analogue frequency-modulated time-base-compressed luminance signal on a first track on a recording medium;

second transducer means for recording said analogue frequency-modulated time-multiplexed color difference signal on a second track on said recording medium.

2. A portable video camera and recording apparatus according to claim 1, wherein said multiplexing means comprises:

second time-base-compressing means for receiving and time-base-compressing said digital color difference signals and outputting digital time-base-compressed color difference signals; and time-multiplexing means for time-multiplexing said digital time-base-compressed color difference signals into said digital time-multiplexed color difference signal.

3. A portable video camera and recording apparatus according to claim 2, wherein said multiplexing means further comprises third time-base-compressing means for receiving and time-base-compressing said digital time-multiplexed color difference signal.

4. A portable video camera and recording apparatus according to claim 3, wherein said recording medium is a magnetic tape and said transducer means is a rotary head which scans said magnetic tape in a range of n/m×360 degrees around a rotational axis of said rotary head while said first and third time-base-compressing means time-base-compress said digital luminance signal and said digital time-multiplexed color difference signal by n/m.

5. A portable video camera and recording apparatus according to claim 4, wherein said second time-base-compressing means time-base-compresses said digital color difference signal by ½.

* * * * *